(12) United States Patent
Gromakov et al.

(10) Patent No.: US 7,228,135 B2
(45) Date of Patent: Jun. 5, 2007

(54) METHOD FOR CELLULAR COMMUNICATIONS

(76) Inventors: Yury Alexeevich Gromakov, 1 Novokuzminskaya str., 7-1, ap.35, Moscow (RU) 109377; Vyacheslav Alexeevich Shevtsov, Astradamskaya str.,7B,ap.98, Moscow (RU) 125206

( * ) Notice: Subject to any disclaimer, the term of this patent is extended or adjusted under 35 U.S.C. 154(b) by 0 days.

(21) Appl. No.: 10/510,884

(22) PCT Filed: Jan. 12, 2004

(86) PCT No.: PCT/RU2004/000004

§ 371 (c)(1),
(2), (4) Date: Jan. 3, 2005

(87) PCT Pub. No.: WO2005/015785

PCT Pub. Date: Feb. 17, 2005

(65) Prior Publication Data

US 2005/0153705 A1    Jul. 14, 2005

(30) Foreign Application Priority Data

Aug. 12, 2003  (RU) .............................. 2003124775

(51) Int. Cl.
*H04Q 7/20*    (2006.01)
(52) U.S. Cl. ...................... 455/440; 455/441; 455/443; 455/444; 455/432.1; 370/331
(58) Field of Classification Search ................ 455/427, 455/432.1, 435.2, 435.3, 436–442, 446, 450, 455/453, 456.1–457, 435.1, 21.1; 370/328, 370/331, 338
See application file for complete search history.

(56) References Cited

U.S. PATENT DOCUMENTS 5,432,842 A * 7/1995 Kinoshita et al. ............ 455/440

(Continued)

FOREIGN PATENT DOCUMENTS

EP        0 715 291        6/1996

(Continued)

OTHER PUBLICATIONS

English translation of RU 227632 claims.

(Continued)

*Primary Examiner*—Joseph Feild
*Assistant Examiner*—Kamran Afshar
(74) *Attorney, Agent, or Firm*—Ladas & Parry LLP

(57) ABSTRACT

The invention relates to cellular communications systems. In order to enhance an efficiency of a cellular communications system a file in electronic form with fragments of a digital geographical map of the vicinity is preliminarily introduced into a control center of a cellular communications system, the map comprising coordinates and characteristics of base stations, arranged in cells and geographical coordinates of the borders of the cells, wherein in the process of radio communications, data on the location of a corresponding mobile station for communication therewith are determined with the aid of a receiver of a satellite location determination system, which receiver is built in a mobile station, and are transmitted through a base station to the control center of the cellular communications system, and the file of a fragment of the digital geographical map is transmitted from the control center of the cellular communications system through a corresponding base station to a mobile station, the map comprising coordinates and characteristics of the base station of that cell where this mobile station is, coordinates and characteristics of base stations of neighboring cells with coordinates of their borders, then a comparison of current data of its location and the coordinates of cell borders is carried out in the mobile station.

19 Claims, 5 Drawing Sheets

U.S. PATENT DOCUMENTS

| | | | |
|---|---|---|---|
| 6,097,957 A * | 8/2000 | Bonta et al. | 455/446 |
| 6,212,386 B1 * | 4/2001 | Briere et al. | 455/447 |
| 6,215,987 B1 * | 4/2001 | Fujita | 455/127.3 |
| 6,411,811 B2 | 6/2002 | Kingdon et al. | |
| 6,631,263 B1 * | 10/2003 | Corkery | 455/436 |
| 6,813,508 B1 * | 11/2004 | Shioda et al. | 455/525 |
| 6,847,822 B1 * | 1/2005 | Dennison et al. | 455/456.1 |
| 7,016,689 B2 * | 3/2006 | Clark et al. | 455/456.1 |
| 7,031,711 B2 * | 4/2006 | Soliman | 455/438 |
| 2001/0004604 A1 * | 6/2001 | Toshimitsu et al. | 455/562 |
| 2002/0034947 A1 * | 3/2002 | Soliman | 455/436 |
| 2002/0173269 A1 * | 11/2002 | Grayson et al. | 455/12.1 |
| 2003/0013452 A1 * | 1/2003 | Hunt et al. | 455/449 |
| 2003/0069043 A1 * | 4/2003 | Chhaochharia et al. | 455/561 |
| 2003/0224804 A1 * | 12/2003 | Liu | 455/456.1 |
| 2004/0029558 A1 * | 2/2004 | Liu | 455/456.1 |
| 2004/0224702 A1 * | 11/2004 | Chaskar | 455/456.3 |

FOREIGN PATENT DOCUMENTS

| | | |
|---|---|---|
| RU | 2157565 | 10/2000 |
| RU | 2207632 | 6/2003 |
| WO | 96/31859 | 10/1996 |

OTHER PUBLICATIONS

English translation of RU 2157565 claim.

* cited by examiner

METHOD FOR CELLULAR COMMUNICATIONS

FIELD OF THE INVENTION

The present invention relates to a field of radio communications and, in particular, to systems of mobile telecommunications and may be implemented for organizing cellular communications systems with a provision of additional types of services to groups of mobile subscribers (clients).

BACKGROUND OF THE INVENTION

The methods of cellular communications are known and based on three principles:
repeated usage of frequencies in cells;
provision of continuity of communication when a mobile subscriber moves from one cell to another one ("handover");
continuous determination of a location of a mobile subscriber in an area of cellular communications (see, e.g. Asha Mehrotra, Cellular Radio. Analog and Digital Systems. Artech House, Inc. 1994. 460 p.).

The diagram of organization of cellular communications on the basis of the above principles is shown in FIG. 1, their combination creates a technological basis of cellular communications for providing services for subscribers. FIG. 2 illustrates a general skeleton diagram of a cellular communications system (see, e.g. Williams C. Y. Lee. Mobile Cellular Telecommunications. Analog and Digital System. Second Edition. McGraw-Hill, Inc. 1995, 664 p.).

The subscriber via his mobile station (MS), transmits messages to other mobile subscribers or subscribers of a fixed communication network (PSTN) via a base station (BTS), a controller (BSC) being series coupled with the base station, and a mobile switching Center (MSC) being coupled with a visitor location register (VLR) tracking a movement of the subscriber, as well as with a home location register (HLC) in which one are contained all necessary data on subscribers who have concluded contracts with an operator of a network and received a subscriber-identity module (SIM-card) of a given operator. An operation of the network is controlled with an operations-and-maintenance Center—OMC.

In the structural block-diagram of FIG. 2 is accomplished a determination of a location of the mobile subscriber (MS) within the limits of "an area of determination of location" (Location Area) which comprises a base station controller (BSC) and all base stations (BTS) being coupled to the controller. Within the limits of Local Area may be identified a cell or a cell sector within which is located MS, for example, to provide for a mobile station a delivery of incoming message from a subscriber of PSTN or from other mobile station of the cellular communications system. Herewith, an accuracy of the determination of the location of MS depends on dimensions of the cell, and it may constitute from few hundreds of meters up to tens of kilometres.

The cellular communications system for active mobile stations being registered in VLR, should continuously determine the location, through control and signalling channels being transmitted jointly with traffic channels through network interfaces (A-bis, A, M and others), for physical implementation of which ones is necessary to use radio-relay, wire or optical fiber transmission lines. For example, in order to control communication processes (including connection of MS, handover, a transmission of messages, transmission power control), in GSM cellular communications network from one up to two time slots (TS) which are contained in a time frame (TDMA-frame) being formed on one of 124 frequency channels. (see, e.g. Siegmund M. Rede, Mathias K. Weber, Malcolm W. Oliphant. An Introduction to GSM. Artech House, Inc. 1995, 379 p). Thus, from 12.5 up to 25 percent of a network resource are not used for a traffic transmission.

Moreover, tendencies of developing services of new generations of cellular communications—the third (3G) and the forth (4G) ones, as well as ones of currently active cellular communications systems of 2,5 generation, provide for wide introduction of new kinds of services associated with a location of subscribers. (see, e.g, Juha Korhenen. Introduction to 3G Mobile Communications. Second Edition. Artech House, Inc. 2003, 544 p.)

To such services relate, for example, navigation services, services of an extreme aid, a tourist guide, safeguarding of goods when transporting etc. The realization of these services is possible if to enhance the accuracy of the determination of location of mobile stations which is achieved with an additional complexity of the cellular communications system on the whole, due to increasing hardware and software costs of cellular communications, due to including new elements, for example, Line measurement units (LMU) of A-type being switched via a radio interface to base stations or LMU of B-type being switched via a radio interface to base stations or LMU of B-type being switched to the base station controller (BSC) via the network A-bis interface, as well as due to Mobile Location Centres (MLC). One of the lasts—SLMC (Serving MLC)—serves requests for the determination of location, realizes a final calculation of coordinates and an accuracy of an obtained result, the other—GMLC (Gateway MLS) performs functions of supporting clients. (see, e.g., ETSI TS 101723 (GSM 02.71): "Digital Cellular Telecommunications System (Phase 2+); Location Services (LCS); Service Description; Stage 1." ETSI TS 122-71 (3GPP TS 22.071): "Digital Telecommunications System (Phase 2+) (GSM); Universal Mobile Telecommunications System (UMTS); Location Services (LCS); Service Description, Stage 1").

The skeleton diagram of the cellular communications network with supporting the functions of determining the location on the basis of the additional measurement units is shown in FIG. 3 and is accepted for GSM—standards and practically coincides with an analogues diagram of new generation of cellular communications—3 G (UMTS).

Methods of determining the location of MS in accordance with the skeleton diagram of FIG. 3 are known in the art and are based on data of the cellular communications network, the closest known technique is a method of a cell identification (Cell ID) for which is not required a determination of a signal level or its delay since this is an intrinsic property of cellular communications networks. As main methods of determining the location of MS for GSM cellular communications networks are selected as follows: Cell ID-TA (Timing Advance), TOA (Time Of Arrival), E-OTD (Enhanced Observed Time Difference). (see, e.g. ETSI TS.101 724 (3GPP TS 03.71): Digital Cellular Telecommunications System (Phase 2+), Location Services (LCS), Functional Description—Stage 2).

Selection of a method of determining the location is defined by a kind of a radio-access network. In case of UMTS (UTRAN) are recommended methods Cell ID-TA and OT DOA (Observed Time Difference Of Arrival). (See, e.g., ETSI TS 125 395 (3PGG TS 25.395): "Universal Mobile Telecommunications System (UMTS); Stage 2, Functional Description on UE Positioning in UTRAN").

The abovementioned methods of determining the location of MS on the basis of a cellular communications network require for their realization an installation of additional hardware and software, for their introduction into a cellular communications network is necessary to dedicate additional connecting lines.

Moreover, the abovementioned methods of determining the location of MS on the basis of a cellular communications network do not change general principles of network composing being presented in FIG. 1. The accuracy of determining the location of MS in these methods constitutes few hundreds of meters.

Methods of determining a location of a subscriber are know on a basis of a mobile station when MS determines a location independently of an network operator. To the methods of determining a location on the basis of MS relate GPS-methods or A-GPS (Assisted GPS)-methods, in the last for obtaining coordinates of MS are used data from additional (assisted) transmitters of signals of GPS being mounted on a ground in an area of a cellular communications network.

GPS—global satellite positioning system—was developed and is used by USA Ministry of Defence for providing terrestrial objects throughout the world with accurate information on a location, speed and current time. Orbital groupment comprises 28 satellites, at least, 24 satellites are activated constantly. Analogous tasks are decided by Russian Global satellite positioning system GLONASS. European global satellite positioning system GALLILEO is in progress of development (see, e.g., U. A. Soloviev. Satellite navigation system—M.; Ecotrends, 2000, 270 p.). (Ю.А. Соловьев. Системы спутниковой навигации.-М; Экотрендз, 2000, 270 с.). The accuracy of determining a location with help of GSM may constitute about ten meters. The accuracy of determining a location is increased when using A-GPS and may constitute few tens of centimetres.

When determining a location of MS with usage of GPS or A-GPS the mobile station with built-in GPS-receiver transmits its coordinates via base stations (BTS) and a controller (BSC) to operation-and-maintenance Center (OMC) through channels of short message service (SMS) or through other channels, in particular, through channels of a subsystem of a packet data transmission (GPRS).

However, in these known methods of determining the location on the basis of global satellite systems the cellular communications network and the system GPS (GLONASS et al.) operate independently of each other. In cellular communications systems for a transmiission of messages, for provision of continuity of communications ("handover"), for repeated usage of frequencies in the network or codes in cells, as well as for controlling operation modes of base and mobile stations, the data from global satellite positioning system are not used. Therefore the communication channels are downloaded, additional hardware and software are used, and the accuracy of determining the location is limited to "a cell", which dimensions may constitute from few hundreds of meters up to tens of kilometres.

Usage of GPS is known as a source of timing signals, the source being independent of a cellular network, in cellular communications system with code-division multiple access (CDMA, IS-95) (see, e.g., Jhong Sam Lee, Leonard E. Miller. CDMA System Engineering Handbook. Artech House. 1998, 1228 p.), but and in this case GPS and a cellular communications network are not interconnected.

In respect of a technical essence of the invention the closest prior art is a method of cellular communications being realized in a cellular communications system GSM, wherein the data of the location of GSM mobile station, being obtained in result of receiving signals of the satellite communications system GPS, are used for searching and transmitting alarm signals (see U.S. Pat. No. 6,411,811 B2, Int. Cl. H04Q 7/20, the data of publication is Jun. 25, 2002).

However, despite the fact that when using the known method an assortment of communications network services of GSM are extended, the data of the location of MS being obtained from GSM, are not used for optimization of operation of the cellular communications system that does not result in a reduction of a load in communication channels, so the task of determining a location is solved in a former manner on the basis of resources and an equipment of the cellular communications network (FIG. 1).

In the known method the usage of data from GPS for transmitting alarm signals and providing services being associated with a location of mobile subscribers, does not change a structure of a cellular communications network, its basic principles (FIG. 1) and does not replace separate functions of the cellular communications system.

DISCLOSURE OF THE INVENTION

The basis of the invention is a task of increasing an efficiency of cellular communications systems by means of increasing their carrying capability (a capacity), decreasing a load on network interfaces on which are transmitted service data (for example, between MS and BTS, BTS and BSC, BSC and MSC), and by means of usage of released resources for transmitting a useful load, by shortage of components of hardware and software of cellular communications, being responsible for a determination of a location of MS, (LMU, SMLC, GMLC et al), as well as by increasing an accuracy of determining the location of MS.

Additional technical task is a functionality extension of the cellular communications system by means of creation of cells being situated at a different height above the surface of the earth (for example, at different floors of buildings) as well as a realization of vertical "handover", organizing corporative groups of mobile subscribers within cells, usage of location data of the mobile station for forming a maximum of a directional characteristic of multibeam antenna with a controllable directional characteristic towards MS.

This task is solved by the fact that in a method for cellular communications, in accordance with the invention, a file in electronic form is preliminarily introduced into a control center of a cellular communications system with fragments of a digital geographical map of the vicinity, the map comprises coordinates and characteristics of base stations arranged in cells, and geographical coordinates of borders of the cells, wherein in the process of radio communications, data on the location of a corresponding mobile station for communication therewith are determined with the aid of a receiver of a satellite location determination system, which receiver is built in a mobile station, and are transmitted through a base station to the control center of the cellular communications system, and the file of a fragment of the digital geographical map is transmitted from the control center of the cellular communications system through a corresponding base station to a mobile station, the map comprising coordinates and characteristics of the base station of that cell where this mobile station is, coordinates and characteristics of base stations of neighboring cells with coordinates of their borders, then a comparison of current data of its location and the coordinates of cell borders is carried out in the mobile station, when there is a transition of the mobile station to another cell—"handover"—and/or when there is a transition from one cellular communications network to another—roaming—data on completion of the "handover" or conduction of the roaming and changes of the working parameters of communications channels are produced in the mobile station and transmitted to a corresponding control center of the cellular communications system.

Moreover, synchronization of operation of the mobile and base stations is carried out in accordance with signals of a satellite location determination system, moreover, the dimension of the fragment of the geographical map transmitted to the mobile station and the periodicity of transmission of data on its location by that mobile station to the control center of the cellular communications system are changed depending on the speed of movement of the mobile station, the current data on the location of the mobile station are used control parameters of adaptive multibeam antenna systems of base stations communicating with the mobile station, including parameters for directing a directional characteristic of antenna systems toward the mobile station. The microcells within a cell that have working communication parameters different from working communication parameters of the instant cell, in particular other types of radio interfaces, protocols, communication standards, are dedicated, wherein coordinates of borders and working parameters of these microcells, recorded in the control center of the cellular communications system, are transmitted through corresponding base stations to mobile stations located in the microcells, the height of location of a mobile station above the surface of the earth, in respect to which corresponding cells or micricells are dedicated, is selected as one of the working parameters, and a vertical "handover" is provided for, herewith the power level of transmitters of mobile and base stations are adjusted depending on their distance from one another on the basis of location data of the mobile and base stations, and also of digital geographical maps being represented in electronic form, used in control center of cellular communications system.

Moreover, during the transmission of the file of the fragment of the digital geographical map from the control center of the cellular communications system through a base station to a corresponding mobile station, adaptation of the dimensions and configuration of the cells and also conditions providing for "handover" to a load created by mobile stations in a cells are carried out herewith depending on the location of a mobile station in a definite cell or definite zone of cellular network communications, of each mobile station, the priorities of access to communication services or the extreme qualitative communication characteristics are determined or access to the communication services or a portion of the communication services on separate of the cellular communications zone or the cell is eliminated, herewith a pointwise or zone tariffing of communication services provided to clients is provided with an arbitrary configuration of the zones, (for example, along automobile highways or railways), the current data on the location of a mobile station, which are available to a mobile client of a cellular network on a global scale, are used to select a mobile communications network being effective on a certain territory, and an available type of service within that network by means of corresponding programming of the mobile station by client or an operator of mobile communications, including taking into account effective tariffs (for example, minimal ones) in communication networks of different operators.

The essence of the invention consists in forming a configuration of cells of base stations, whose borders are a set of geographical coordinates, provision of a procedure of a transition from one cell to another one when crossing the above borders of the cells and determination of a location of the mobile station on a basis of the coordinates being obtained from a satellite location determination system, for example, GPS. Herewith current data on the location of mobile stations are transmitted from the mobile stations, comprising a receiver of a satellite location determination system, through base stations of a cellular communications system to the control center of the cellular communications system which the center forms fragments of a geographical map in an electronic (digital) form, the geographical map comprising coordinates of borders of the cell for a given base station and of the cells of neighboring base stations, their working parameters of communication channels (frequencies, codes etc.), and the above fragments of the geographical maps are transmitted to the mobile stations for storing them and subsequent comparison on the mobile station with current data of the satellite determination of the location in order to define the working parameters of the communication channel and to provide for the procedure of a transition of the mobile station from one cell to another one or from one network into another one—when roaming—or when changing one kind of a radio-access or a communication network to another kind.

Moreover, the periodicity of determining the location of the mobile station and the dimension of the fragment of the geographical map are adapted to the speed of movement of the mobile station, the data of it's satellite determination of the location are used on base stations for changing parameters of directional characteristics of antenna systems of base stations in order to increase a communication range, to enhance a quality of communication and a capacity of communication. Forming within cells microcells having working communications parameters, being different from the parameters of the cells and associated, in particular, with the height of a location of mobile station provide for an opportunity of reliable communication with flying vehicles including an interaction with high altitude radio-relay stations, for example, HAPS (High Altitude Platform Station).

Essentially, an increase of efficiency of cellular communications is achieved by means of elimination, from the known method for cellular communications (FIG. 1), of the function of determining a location being realized by the cellular communications network and by a construction of the cellular communications system with a usage of resources of global satellite positioning system of the type GPS, GLONASS, GALILEO or other analogous satellite systems for a realization of the function of determining a location in a structure of the cellular communications network, as well as by means of provision of "handover", repeated usage of frequencies or codes dividing communication channels, and other functions with a transmission of data files of digital geographical maps to mobile stations. Herewith, in the mobile station is made comparison of current data of its location and the coordinates of borders of this cell, when there is a transition of the mobile station from one cellular communications network to another one, data for "handover" or roaming and changes of the working parameters of communications channels are produced in the mobile station and transmitted to a corresponding control center of the cellular communications network, synchronization of operation of the mobile and base stations is carried out in accordance with signals of a satellite location determination system.

BEST VARIANT OF EMBODIMENT OF THE INVENTION

Figure 1:
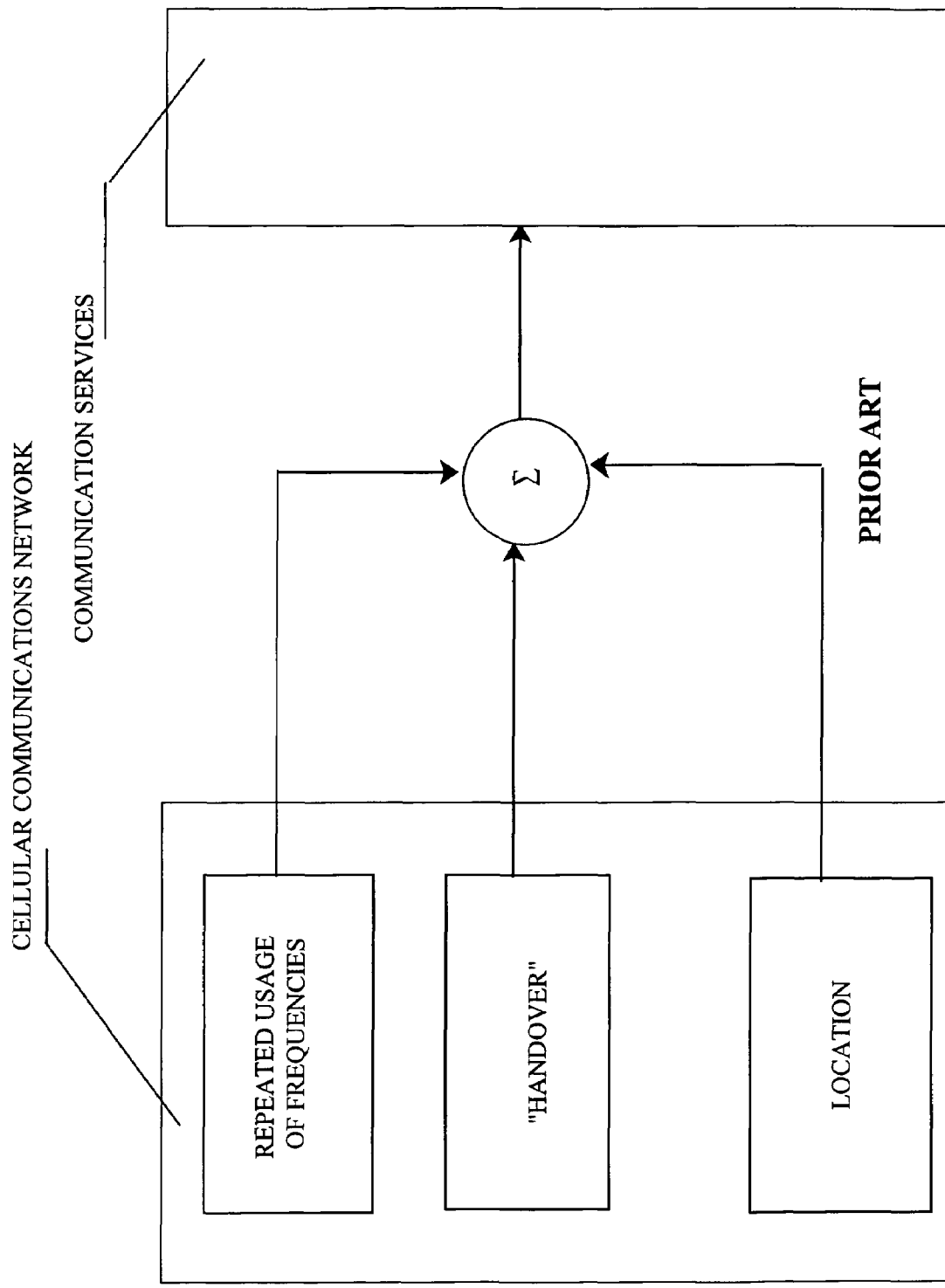
FIG. 1, 2, 3 illustrate skeleton diagrams of a network of known cellular communications, FIGS. 4 and 5—diagrams of organization of cellular communications which ones realize the claimed method.
Figure 2:
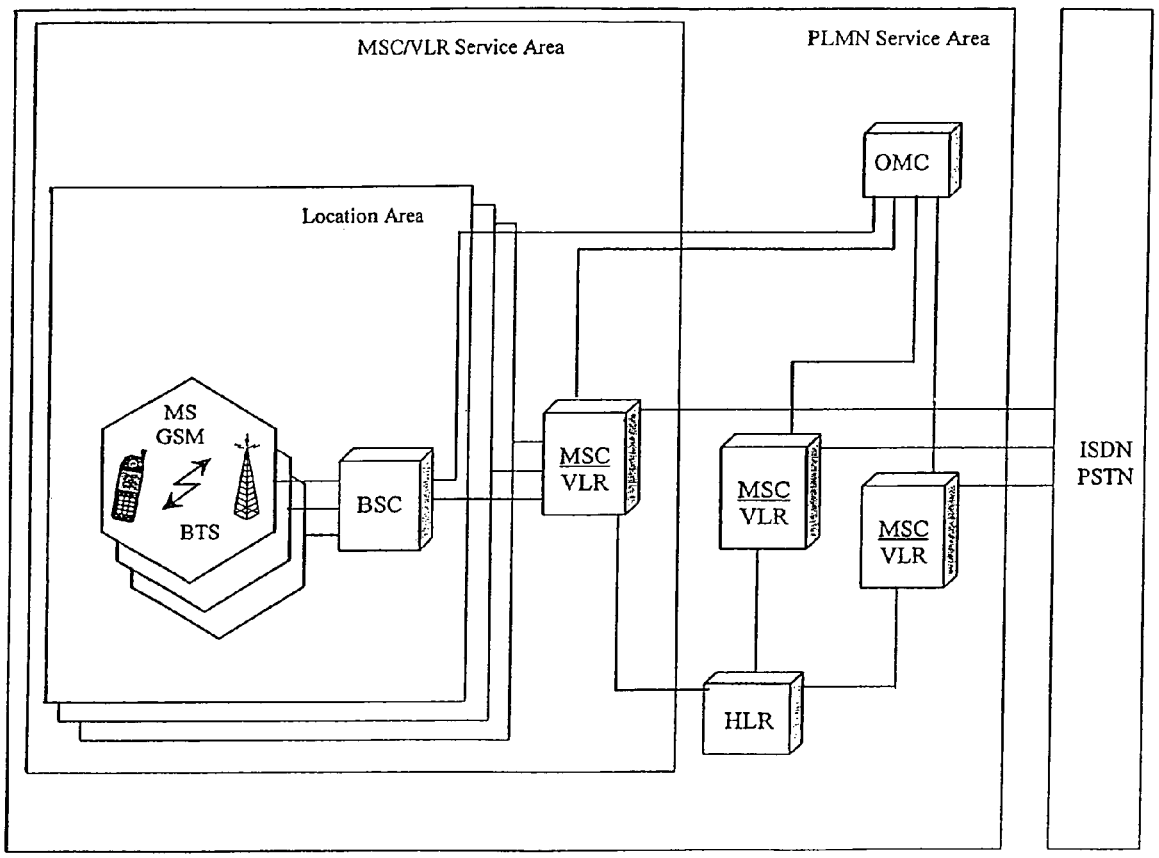
Figure 3:
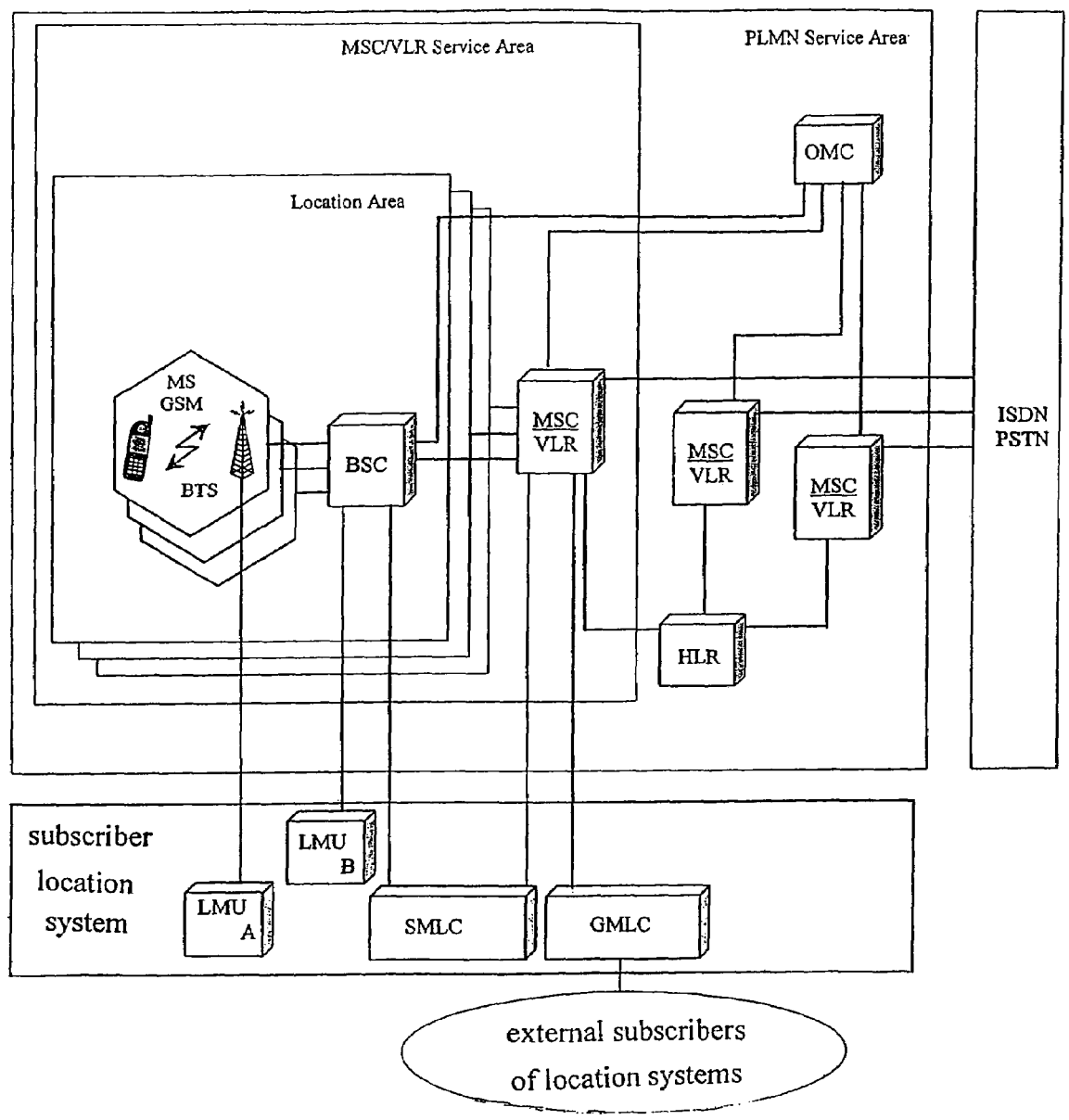
Figure 4:
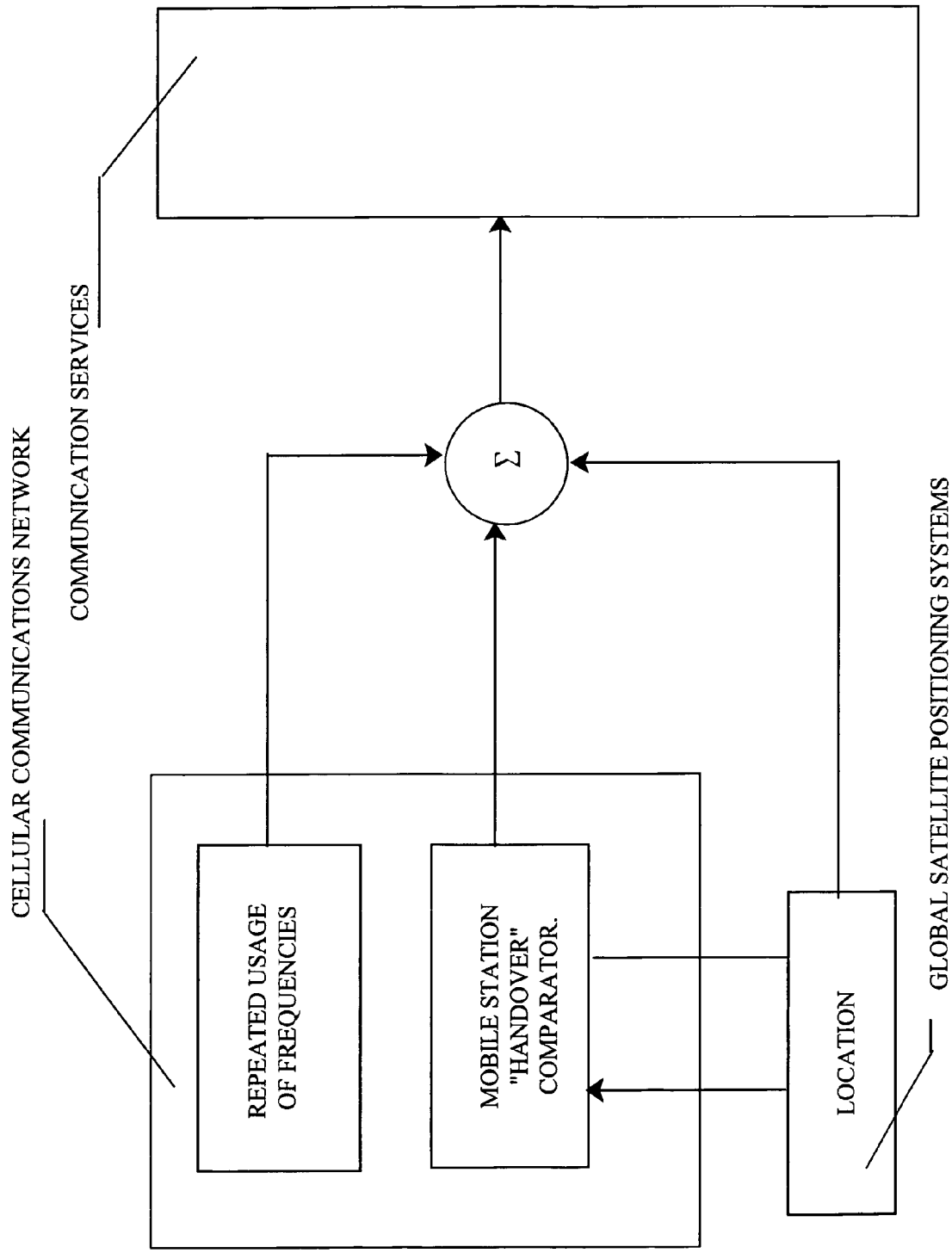
Figure 5:
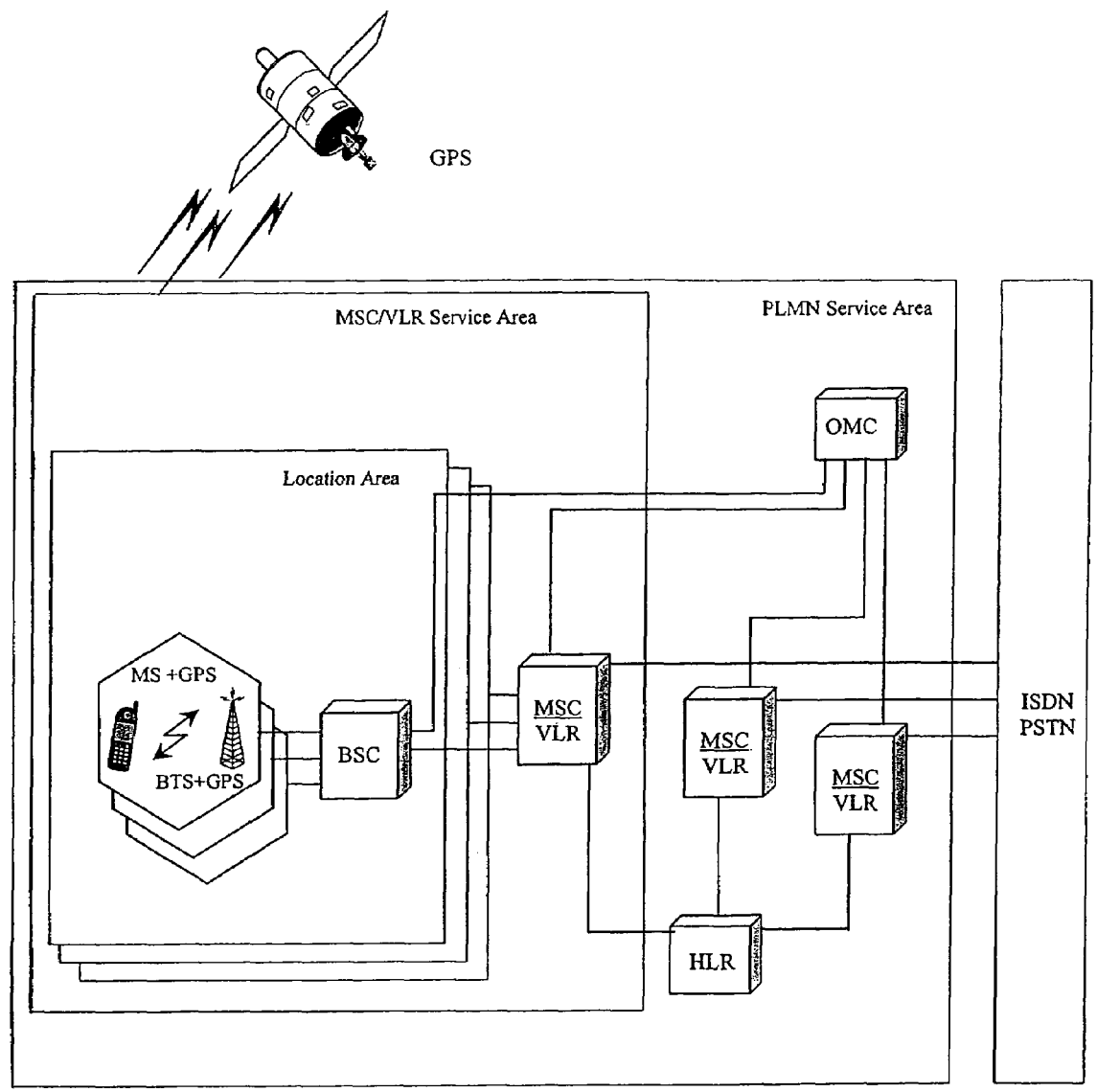

In the system depicted in FIG. 5 a determination of location of mobile stations is realized not with elements of a cellular communications system, but is realized with an external, in respect to the cellular communications system, system of determining a location, in the capacity of which one is proposed to use a global satellite positioning system of mobile objects (GPS, GLONASS etc.).

Now will be considered in more details functioning of the cellular communications system in accordance with the claimed method.

On the basis of a digital map of the vicinity taking into account building (a height and dimensions of buildings, street configuration etc.), and a model of a wave propagation under conditions of various building which ones are applicable to a prescribed frequency range and a dedicated frequency resource, a coverage zone is calculated taking into account a predictable loads in communication channels, requirements to reliability and quality of communication, directionality of antennae, conditions of electromagnetic compatibility with other radio-electronic means, requirements to provide for "handover" etc. In result of the calculation are determined the coordinates, the height of location and parameters of base stations in a communication system. For each base station is generated a configuration of its cell which one, in form of coordinates of the borders of the cells, including spatial ones, is written and stored in the control center of the cellular communications system (OMG), wherefrom necessay data are transmitted and written into controllers (BSC) for control of corresponding base stations (BTS). These characteristics together with the coordinates of borders of neighboring cells, i.e., their working frequencies, codes and parameters of communication, generate a digital geographical map in form of fragments of electronic kind.

The control center of the cellular communications system (OMC) may be implemented analogously to control centers of existing cellular communications systems on the basis of a personal electronic computing machine (PECM) of PC-type, but is provided with corresponding software for performing all operations for realization of the claimed method.

The satellite positioning system comprises a set of satellites (more than three), that allows to a mobile station to realize a determination of a location not only in a plane of earth surface, but also in a space, herewith the satellite positioning system carries out also time synchronization of operation of mobile and base stations.

Note: the term "mobile station" in the present context corresponds to the term "mobile subscriber" since is observed an unique association of conceptions—a mobile station—this is an integral accessory of a mobile subscriber of a cellular network.

Mobile station (MS), which should comprise a terminal of cellular communications, a receiver of a satellite location determination system and a controller for storing and processing data of a geographical map, when receiving and processing signals from satellites periodically processes own spatial coordinates, including geographical ones, the periodicity of determining the coordinates is adapted (associated) to a speed of movement of the mobile subscriber. If the results are materially different ones at two successive determinations of own coordinates, i.e. the mobile subscriber moves at high speed (makes use of a transport), the time between the determinations of a location (the determination of the coordinates) is reduced for increasing the accuracy of the determination of the location of the mobile station.

Base station (BTS) at the first entry of the mobile station (MS) into its cell transmits to it the fragment of the geographical map in electronic form, the fragment being requested from the control center of the cellular communications system (OMC), on which map are indicated the coordinates of the borders of the given cell and neighboring cells, as well as working frequencies or codes of base stations and communication parameters, the dimension of the fragment of the digital geographical map in electronic form is adapted to the speed of movement of the mobile subscriber.

The mobile station (MS) periodically compares the data of determining the location, being obtained from the satellite system GPS (or analogues one), with the fragment of the digital geographical map in electronic form, in order to determine the cell of its location (the belonging to the base station). When changing a cell of its location, the mobile station (MS) transits to a working frequency or a code, as well as to communication parameters of the base station (BS) of the cell in which one is the mobile station.

Thus, the application of the global satellite positioning system to realization of functions of positioning within the limits of a cellular communications system gives an opportunity to materially reduce a load in control and signaling channels on network interfaces of the cellular communications system.

In multistoried buildings, because of specific conditions of wave propagation, various stories may relate to different cells, and the spatial determination of the location allows to realize a vertical "handover" that is important also for provision of communication with flying vehicles.

Positioning data, being transmitted by MS to base stations, allow to realize communication with mobile stations with the aid of multibeam intellectual antennae (see Appendix 1), the maximum of directional characteristics of which ones is oriented directly on coordinates of the mobile station, and which ones trace the movements of MS in a accordance with the positioning data.

Usage of accurate coordinates of mobile stations in the intellectual antenna control system, the coordinates being obtained from GPS, allows to eliminate modes of smooth retuning of the directional characteristics of adaptive antennae and to introduce a mode of beam switching that shortens the time of connection establishment.

Within the limits of one cell (i.e. when working at one group of frequencies or codes) is possible to form the cells with predetermined borders of geographical coordinates. Mobile subscribers, being located in which ones, use the communication parameters: the type of interface, transmission speed, communication protocol, tariff etc., being different from communication parameters of the cell. That is, when a mobile subscriber is within the limits of the microcell, he takes enjoyment in a number of privileges and additional services.

The accurate positioning of mobile stations through the satellite positioning system allows to provide roaming when there is a transition of MS from one communications network to another one within the limits of one communication standard or different communication standards or different forms of radio communication. In this case are formed the coordinates of a border cell in accordance with the coordinates of borders (in particular, with frontiers) of communications networks. The mobile subscriber, when crossing the frontier or the zone of cellular communications, enjoys of roaming service immediately after crossing the border of the zone of communications, in contrast to currently active communications networks in which ones the zones of communications and the cell borders depend on conditions of wave propagation of the vicinity and, in principle, can not be uniquely coupled with borders of networks (with the borders of licensed territories). Moreover, the usage of digital electronic maps of the vicinity and the data of the location of MS being received from global satellite positioning systems, taking into account the building and the conditions of location of antenna systems of base stations, as well as a model of wave propagation, the usage allows to adjust the power level of transmitters of mobile and base stations depending on their distance from one another.

Depending on a load created by mobile stations within a cell, the dimensions and configuration of the cells being defined with geographical coordinates, as well as the conditions of the "handover" may be set in the distance for each mobile station from the control center of the cellular communications system.

High accuracy of determining a location on the basis of data of the global satellite system depending of the location of a mobile station within a definite zone, allows for each mobile station to determine priorities of an access to communication services or the extreme communication characteristics, or to eliminate, on the whole, an access to the network. The clamed method provides a pointwise or zone tariffing of communication services provided to subscribers with an arbitrary configuration of the zones.

The current data on the location of a mobile station, which are available to a mobile subscriber on a global scale, are used to select a mobile communications network as well as an available type of service within that network by a corresponding programming of the mobile station by a subscriber or an operator of mobile communication, including taking into account effective tariff for communication services.

Thus, the claimed method allows to increase an efficiency of operation of cellular communications systems owing to usage of resources of global satellite positioning system of the type of GPS, GLONASS et al., the resources are used within the limits of a cellular communications network for realization of functions of determining a location of mobile stations. As a result are achieved:

a decrease of hardware an software costs of cellular network;

a reduction of a load on network interfaces (between MS and BTS, BTS and BSC, BSC and MSC), on which ones are transmitted service data, and a possibility being appeared to use released resources for transmitting a useful load, to increase a capacity of the cellular communications network;

an increase of accuracy of determining the location of mobile stations, that allows to realize an automatic "handover" when MS crossing the borders of cells, the borders being determined in form of a system of geographical coordinates and the height of location of a mobile station;

to provide a control of directional characteristics of antennae in adaptive multibeam antennae with the maximum towards mobile stations and to implement a control of a radiating power of base and mobile stations;

to create borders of cells and microcells (on geographical principle) of any shape, as well as to adapt dimensions and configuration of cells when the load is changed within cells;

to provide the priorities of an access of different groups of subscribers in different zones of cellular communications to grant to subscribers a service of an accurate zone tariffing of communication services, to program communication conditions (the network to be used, services tariffs), as well a0s to carry out a reliable transition from one communication network to another one in process of traveling the subscriber.

INDUSTRIAL APPLICABILITY

The abovementioned advantages of the proposed method allows an opportunity of wide industrial usage of it in the field of radio communication for organizing cellular communications networks with provision of additional communication forms of services and the priority of an access of subscribers within different zones of cellular communications, as well as to-implement a reliable transition from one communication network to another one in a process of movement of a subscriber.

The invention claimed is:

1. A method for cellular communications, characterized in that:

a file in electronic form with fragments of a digital geographical map of the vicinity is preliminary introduced into a control center of a cellular communications system, the map comprising coordinates and characteristics of base stations arranged in cells and geographical coordinates of the borders of the cells, wherein in the process of radio communications, data on the location of a corresponding mobile station for communication therewith are determined with the aid of a receiver of a satellite location determination system, which receiver is built in a mobile station, and are transmitted through a base station to the control center of the cellular communications system, and the file of a fragment of the digital geographical map is transmitted from the control center of the cellular communications systems through a corresponding base station to a mobile station, the map comprising coordinates and characteristics of the base station of that cell where this mobile station is, coordinates and characteristics of the base station of neighboring cells with coordinates of their borders; and then, in the mobile station, a comparison of current data of its location and the coordinates of cell borders is carried out at least one of when there is a transition of the mobile station to another cell—"handover"—or when there is a transition from one cellular communications network to another—roaming—data on completion of the "handover" or conduction of the roaming and changes of the working parameters of communications channels and produced in the mobile station and transmitted to a corresponding control center of the cellular communications systems, characterized in that the dimension of the fragment of the geographical map transmitted to the mobile station and the periodicity of transmission of data on its location by that mobile station to the control center of the cellular communications system are changed depending on the speed of movement of the mobile station.

2. The method according to claim 1, characterized in that synchronization of operation of the mobile and base stations is carried out in accordance with signals of a satellite location determination system.

3. The method according to claim 2, characterized in that the current data on the location of the mobile station are used to control parameters of adaptive multibeam antenna systems of base stations communicating with the mobile station, including parameters for directing a directional characteristic of antenna systems toward the mobile station.

4. The method according to claim 2, characterized in that microcells within a cell that have working communication parameters different from working communication parameters of the instant cell, in particular other types of radio interfaces, protocols, communication standards, are dedicated, wherein coordinates of border and working parameters of these microcells, recorded in the control center of the cellular communications system, are transmitted through corresponding base stations to mobile stations located in the microcells.

5. The method according to claim 2, characterized in that a height of location of a mobile station above the surface of the earth, in respect to which corresponding cells or microcells are dedicated, is selected as one of the working parameters, and a vertical "handover" is provided for.

6. The method according to claim 2, characterized in that a power level of transmitters of mobile and base stations are adjusted depending on their distance from one another on the basis of location data of the mobile and base station, and also of digital geographical maps, used in the control center of the cellular communications system.

7. The method according to claim 1, characterized in that the current data on the location of the mobile station are used to control parameters of adaptive multibeam antenna systems of base stations communicating with the mobile station, including parameters for directing a directional characteristic of antenna systems toward the mobile station.

8. The method according to claim 1, characterized in that microcells within a cell that have working communication parameters different from working communication parameters of the instant cell, in particular other types of radio interfaces, protocols, communication standards, are dedicated, wherein coordinates of border and working parameters of these microcells, recorded in the control center of the cellular communications system, are transmitted through corresponding base stations to mobile stations located in the microcells.

9. The method according to claim 1, characterized in that a height of location of a mobile station above the surface of the earth, in respect to which corresponding cells or microcells are dedicated, is selected as one of the working parameters, and a vertical "handover" is provided for.

10. The method according to claim 1, characterized in that the power level of transmitters of mobile and base stations are adjusted depending on their distance from one another on the basis of location data of the mobile and base station, and also of digital geographical maps, used in the control center of the cellular communications system.

11. The method according to claim 1, characterized in that depending on the location of a mobile station in a definite cell or definite zone of cellular network communication, of each mobile station, the priorities of access to communications services of the extreme qualitative communication characteristics are determined or access to the communications services or a portion of the communications services on separate sections of the cellular communications zone or the cell is eliminated.

12. The method according to claim 1, characterized in that a pointwise or zone tariffing of communication services provided to clients is provided with an arbitrary configuration of the zones.

13. The method according to claim 1, characterized in that current data on the location of a mobile station, which are available to a mobile client of a cellular network on a global scale, are used to select a mobile communications network and an accessible type of service within that network by a corresponding programming of the mobile station by a client or operator of mobile communications, including taking into account tariffs for communication services in communication networks of different operators.

14. The method according to claim 1, characterized in that the current data on the location of the mobile station are used to control parameters of adaptive multibeam antenna systems of base stations communicating with the mobile station, including parameters for directing a directional characteristic of antenna systems toward the mobile station.

15. The method according to claim 1, characterized in that microcells within a cell that have working communication parameters different from working communication parameters of the instant cell, in particular other types of radio interfaces, protocols, communication standards, are dedicated, wherein coordinates of border and working parameters of these microcells, recorded in the control center of the cellular communications system, are transmitted through corresponding base stations to mobile stations located in the microcells.

16. The method according to claim 1, characterized in that a height of location of a mobile station above the surface of the earth, in respect to which corresponding cells or microcells are dedicated, is selected as one of the working parameters, and a vertical "handover" is provided for.

17. The method according to claim 1, characterized in that a power level of transmitters of mobile and base stations are adjusted depending on their distance from one another on the basis of location data of the mobile and base station, and also of digital geographical maps, used in the control center of the cellular communications system.

18. In a method for cellular communications, the improvements comprising:
- introducing into a control center of a cellular communications system an electronic file of a digital geographical map of geographical coordinates of borders of cells defined by base stations of the cellular communications system having coordinates and characteristics;
- determining a location of a mobile station of the cellular communication system with a receiver of a satellite location determination system in the mobile station;
- transmitting the location of the mobile station through one of the base stations to the control center;
- transmitting from the control center through the one of the base stations to the mobile station the coordinates and characteristics of the one of the base stations and, as determined from the map, the coordinates and characteristics of at least one of the base stations neighboring the one of the base stations and geographical coordinates of at least the one of the borders of the cell thereof with the cell of the one of the base stations; and
- then, in the mobile station, comparing another determination of a current location of the mobile station at least with the geographical coordinates of the one of the borders of the cell of the neighboring base station to determine a transition of the mobile station across the border of the neighboring base station for use from the mobile station of the coordinates and characteristics of the neighboring base station, characterized in that the dimension of the fragment of the geographical man transmitted to the mobile station and the periodicity of transmission of data on its location by that mobile station to the control center of the cellular communications system are changed depending on the speed of movement of the mobile station, and characterized in that during the transmission of the file of the fragment of the digital geographical man from the control center of the cellular communications system through a base station to a corresponding mobile station, adaptation of the dimensions and configuration of the cells and also conditions providing for "handover" to a load created by mobile stations in a cell are carried out.

19. A method for cellular communications in accordance with which mobile station are previously provided with receivers of satellite location determination system and controllers for storing and processing data of a digital geographical map, in a control center of a cellular communications system is generated a file with fragments of the digital geographical map for base stations, wherein the fragment for each base station comprises coordinates of borders of its cell, coordinates of borders of neighboring cells, their operating frequencies, codes and communications parameters, these fragments are transmitted to corresponding base stations for recording into controllers of these base stations, and in process of radio communications each base station at first entering its sell of some mobile station, which establishes a communication with this base station, transmits to this mobile station a corresponding fragment of the digital geographic map for recording in its controller, the mobile station periodically compares data of its location, being received with help of its receiver of the satellite location determination system, with the stored fragment of the digital geographic map and when crossing the border of the cell of its location the mobile station produces data for "handover" or "roaming" and independently transits to the operating frequency, being contained in the above fragment of the digital geographic map, code and communications parameters of the base station of the new cell into which it transits thereby realizing "handover", and when transiting to other cellular communications network realizing "roaming", after that the mobile station transmits to a corresponding control centre of the cellular communications system data on completion of the "handover" or "roaming" and on change of operating parameters of communications channels, characterized in that during the transmission of the file of the fragment of the digital geographical map from the control center of the cellular communications system through a base station to a corresponding mobile station, adaptation of the dimensions and configuration of the cells and also conditions providing for "handover" to a load created by mobile stations in a cell are carried out.

* * * * *